C. L. WEIL.
METHOD AND APPARATUS FOR PURIFYING LIQUIDS.
APPLICATION FILED DEC. 31, 1915.

1,199,514.

Patented Sept. 26, 1916.

Inventor
Charles L. Weil

By Whittemore Hulbert + Whittemore
Attorneys

UNITED STATES PATENT OFFICE.

CHARLES L. WEIL, OF PORT HURON, MICHIGAN.

METHOD AND APPARATUS FOR PURIFYING LIQUIDS.

1,199,514.  Specification of Letters Patent.  Patented Sept. 26, 1916.

Application filed December 31, 1915. Serial No. 69,554.

*To all whom it may concern:*

Be it known that I, CHARLES L. WEIL, a citizen of the United States of America, residing at Port Huron, in the county of St. Clair and State of Michigan, have invented certain new and useful Improvements in Methods and Apparatus for Purifying Liquids, of which the following is a specification, reference being had therein to the accompanying drawings.

The invention relates to process of removing impurities from liquids, being more particularly adapted for use in purifying liquids containing substances normally in solution but which are precipitated by heat. As a specific instance, calcium sulfate which has a limited solubility in water when cold will be precipitated by the heating of the water above the normally "boiling point."

It is the object of the invention to facilitate the heating of the liquid to high temperature and also the separation of the precipitate so as to avoid clogging of the apparatus.

To this end the invention comprises, first, the novel process or method of treatment; and second, the peculiar construction of apparatus for carrying out this treatment.

Figure 1:
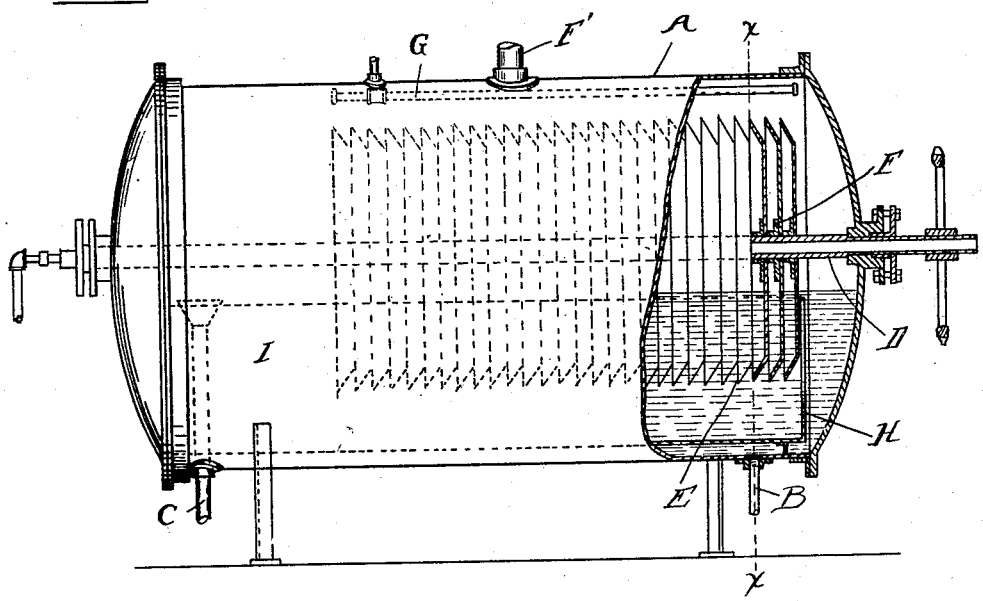
Figure 2:
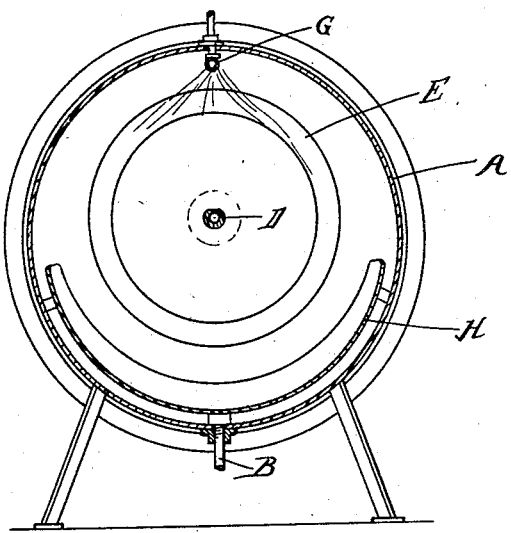

In the drawings: Figure 1 is a sectional elevation of an apparatus suitable for carrying out my improved process; and Fig. 2 is a cross section thereof.

In the present state of the art water and other liquids have been purified by passing the same through a steam-heated chamber in which are arranged a series of pans, the liquid passing from one pan to another and being heated through contact with the steam. A difficulty encountered with apparatus of this type is the tendency for the precipitate to build-up at certain points, particularly where the drip occurs from one pan to another. Furthermore, although the depth of the water in the pans is not great it is nevertheless sufficient to produce different conditions at the surface and in the interior of the mass. With my improved construction instead of treating the liquid in pans it is subjected in film form to a highly heated atmosphere, and the liquid film after treatment is separated from the untreated liquid to avoid contamination.

With the apparatus as shown in the drawings, A is a casing of cylindrical form, the axis of the cylinder being horizontal, B is an inlet for the liquid to be treated, preferably arranged at the bottom of the receptacle, and C is an outlet or overflow arranged at one end of the cylinder for maintaining a level slightly below the axis of the cylinder. Passing axially within the cylinder is a rotary shaft D, on which is mounted a series of disks E separated from each other by spacers F. The parallel portions of these disks are preferably dished, as shown, so that the outer edge is in the plane of the next adjacent disk.

F' is a steam inlet conduit connected with the upper end of the cylinder, and G is a spray pipe extending longitudinally of the cylinder above the disks and having jet perforations therein which may be directed against the surface of the disks.

H is a pan in the lower portion of the cylinder for catching the water from the spray as hereinafter described.

In use, the liquid to be purified may be fed continuously into the cylinder through the inlet B, while the level is maintained constant by the overflow connection C. At the same time steam is admitted through the conduit F' and forms an atmosphere of high temperature in the upper part of the cylinder and surrounding the exposed portions of the disks E. The shaft D is continuously but slowly revolved, and as a result the liquid contacting with the immersed portion of the disks will be carried upward in the form of films adhering to the disks and slowly passed through the heated atmosphere. The liquid film will cover all portions of the surface, and by reason of the thinness of the film it will be quickly raised to a temperature equal to that of the surrounding atmosphere. The temperature of the liquid in the bottom of the receptacle is not, however, as high as it is only subjected to surface action of the steam and its conductivity to heat is relatively low. The liquid film after completing the portion of the orbit exposed to the steam atmosphere will be carried down again to the surface of the liquid in the lower portion of the receptacle. Here the difference in temperature of the liquid in the film and that of the mass of liquid below the surface will effect a gravity separation, the heated liquid being displaced by the colder liquid and flowing over the surface toward the overflow conduit C. Thus there is no tendency for the purified liquid to commingle with the unpurified liquid, which insures thorough purification of the entire mass.

When precipitation takes place in the liquid film the distance between the precipitate and the surface of the disk is so slight that it will be deposited upon the latter during the time interval in which the disk is passing from the point of emerging from the liquid mass to the point of re-entrance. Thus the impurities remain as deposits on the disks, while the purified liquid flows away. If, however, any portion of the precipitate remains in the liquid which is stripped from the disk and flows over the surface to the overflow opportunity will be afforded for this to settle down into the mass of liquid below, and to facilitate this action I have provided a settling chamber I at the end of the vessel adjacent to the overflow and beyond the last of the series of disks.

Whenever the deposit upon the disks becomes excessive, by draining off the liquid from the receptacle and introducing cold water through the spray pipe G cold water jets are directed against the surface of the disks, and the sudden chilling will cause the aggregating of the film of deposit so that it is permitted to drop off. The pan H in the lower portion of the vessel will catch this deposit and also the cold water, thereby avoiding the sudden chilling of the outer shell which would be injurious thereto. To completely remove the scale it is necessary to detach the disks and remove them from the casing, and to facilitate this operation the shaft D is hollow so as to permit of passing cold water therethrough while the disks are at high temperature. This will cause a relative contraction of the shaft which will loosen the disks and permit them to be slipped off while the detachment of one of the heads of the outer casing will permit removal of the disks for cleaning.

What I claim as my invention is:—

1. The method of purifying liquids containing soluble impurities which are precipitated by heating, comprising the passing of a surface alternately through the impure liquid and through a highly-heated atmosphere to expose an adhering film of liquid to said atmosphere, and the separation of the purified liquid in said film from the impure liquid.

2. The method of purifying liquids containing soluble impurities which are precipitated by heating, comprising the passing of a surface alternately through the impure liquid and a highly heated atmosphere to carry a film of the liquid through said atmosphere, and in washing off the purified liquid of said film from said surface upon the subsequent immersion of said surface in the impure liquid by the displacement of the latter.

3. The method of purifying liquids containing soluble impurities which are precipitated by heating, comprising the rotation of a series of members partially immersed in the impure liquid to draw upward adhering films of said liquid, exposing said films to a highly-heated atmosphere to precipitate impurities upon the surface of the members, washing off the purified liquid from the members upon the re-immersion of the same in the impure liquid, and separating the pure liquid from the impure liquid.

4. The method of purifying liquids containing soluble impurities which are precipitated by heating, comprising the rotation of a series of members partially immersed in the impure liquid to draw upward adhering films of liquid, exposing said films to a highly-heated atmosphere to precipitate impurities upon the surface of the members, washing off the purified liquid from the members by the displacement of the impure liquid on re-immersion of the members, maintaining said purified and impure liquids separate by difference in gravity due to difference in temperature, and continuously renewing the supply of cold impure liquid below the surface and removing the hot pure liquid from the surface.

5. An apparatus for purifying liquids, comprising a container, means for introducing the impure liquid into the lower portion thereof and maintaining a highly-heated atmosphere in the upper portion thereof, a revoluble surface partially immersed in the liquid adapted to carry upward the liquid film exposed to the heated atmosphere to cause precipitation of the impurities on said surface, and means for removing the purified liquid from the surface of the impure liquid.

6. An apparatus for purifying liquids, comprising a container, means for introducing impure liquid into the lower portion of said container and maintaining a highly-heated atmosphere in the upper portion thereof, a series of members revoluble within said container having a portion thereof immersed in the impure liquid to carry films of liquid upon the exposed portions, whereby the impurities are precipitated on the surface of said members, and means for removing the purified liquid from the surface of the impure liquid.

7. In an apparatus for purifying liquids, a container, a series of revoluble members in said container having a portion of their surface immersed in the impure liquid and a portion exposed to a highly-heated atmosphere, whereby liquid films are drawn up and exposed to the heat to precipitate impurities on the surface of the members, means for removing the purified liquid from the surface of the impure liquid, and means for periodically spraying said members with cold liquid to remove the impurities adhering thereto.

8. An apparatus for purifying liquids, comprising a container, a series of revoluble members therein, a pan within said container, and means for periodically spraying the members with cold liquid, and catching the same in said pan.

9. An apparatus for purifying liquids, comprising a container, a series of revoluble disks therein, and a hollow shaft on which said disks are sleeved, for the purpose described.

10. The method of purifying liquids containing soluble impurities which are precipitated by heating, comprising the passing of a surface alternately through the impure liquid and through a highly-heated atmosphere to expose an adhering film of liquid to said atmosphere.

11. The method of purifying liquids containing soluble impurities which are precipitated by heating comprising the passing of a surface alternately through the impure liquid and through a highly heated atmosphere to expose an adhering film of the liquid to said atmosphere, washing off the purified liquid from said surface by the displacement of the impure liquid on the reimmersion of said surface, maintaining said purified and impure liquids separate by difference in gravity due to difference in temperature, continuously renewing the supply of impure liquid and removing the purified liquid from the surface of the impure liquid.

12. An apparatus for purifying liquids comprising a container for a body of the impure liquid, means for maintaining a highly heated atmosphere in the container above said body of liquids, means for continuously displacing small portions of the liquid from said body into the overlying heated atmosphere to be purified by heat and for returning the purified portions to said body, and means for removing the purified liquid from the surface of said body, a gravity separation of the purified and impure liquids being produced by their difference in temperature.

13. The method of purifying liquids containing soluble impurities which are precipitated by heating comprising the production of a film of the liquid upon the surface of a solid and the exposure of said film to a highly heated atmosphere.

In testimony whereof I affix my signature in presence of two witnesses.

CHARLES L. WEIL.

Witnesses:
JAMES P. BARRY,
PHYLLIS COBURN.